United States Patent
Park et al.

(10) Patent No.: US 9,872,277 B2
(45) Date of Patent: Jan. 16, 2018

(54) BEAM SELECTION APPARATUS AND METHOD FOR SELECTING BEAM IN A FIXED BEAM TERMINAL

(71) Applicant: Electronics and Telecommunications Research Institute, Daejeon (KR)

(72) Inventors: Hyeong Sook Park, Daejeon (KR); Yong Su Lee, Daejeon (KR); Youn Ok Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 172 days.

(21) Appl. No.: 14/948,554

(22) Filed: Nov. 23, 2015

(65) Prior Publication Data

US 2016/0192329 A1 Jun. 30, 2016

(30) Foreign Application Priority Data

Dec. 30, 2014 (KR) .................. 10-2014-0194062
Mar. 30, 2015 (KR) .................. 10-2015-0044538

(51) Int. Cl.
*H04W 72/04* (2009.01)
*H04W 72/02* (2009.01)
(Continued)

(52) U.S. Cl.
CPC ............ *H04W 72/02* (2013.01); *H04B 7/088* (2013.01); *H04B 17/318* (2015.01);
(Continued)

(58) Field of Classification Search
CPC .. H04W 72/02; H04W 72/046; H04B 17/318; H04B 17/327; H04B 17/364; H04B 7/088; H04B 7/0404
(Continued)

(56) References Cited

U.S. PATENT DOCUMENTS 6,385,181 B1 * 5/2002 Tsutsui .................. H04B 1/712
370/335
2002/0088940 A1 * 7/2002 Watanabe ............. H01J 37/224
250/310

(Continued)

FOREIGN PATENT DOCUMENTS

KR 1020140092165 A 7/2014
KR 1020140123711 A 10/2014
KR 1020140126555 A 10/2014

OTHER PUBLICATIONS

Kyu Seok Kim et al., "A Beam-pair Tracking Technique for Millimeter-Wave Cellular Communication Systems," The Korean Institute of Communications and Information Sciences 2014 Summer Conference, Jun. 26, 2014, pp. 422-424, Korea Information and Communications Society.

*Primary Examiner* — Afsar M Qureshi
(74) *Attorney, Agent, or Firm* — William Park & Associates Ltd.

(57) ABSTRACT

The exemplary embodiment of the present invention provides a beam selecting apparatus of a fixed beam terminal, including: a delay time measuring unit which measures delay times of a plurality of signals received through a plurality of beams; a beam selecting unit which compares a threshold value selected based on the measured delay time and a signal strength of each of the plurality of signals to select a beam; and a switching type beam former which operates the plurality of beams in accordance with the selected beam.

17 Claims, 4 Drawing Sheets

(51) Int. Cl.
*H04W 56/00* (2009.01)
*H04B 17/318* (2015.01)
*H04B 7/08* (2006.01)
*H04B 17/327* (2015.01)
*H04B 17/364* (2015.01)
*H04B 7/0404* (2017.01)

(52) U.S. Cl.
CPC ....... *H04W 56/0065* (2013.01); *H04B 7/0404* (2013.01); *H04B 17/327* (2015.01); *H04B 17/364* (2015.01)

(58) Field of Classification Search
USPC .......................................... 370/329
See application file for complete search history.

(56) References Cited

U.S. PATENT DOCUMENTS

| | | | |
|---|---|---|---|
| 2003/0117320 A1* | 6/2003 | Kim | G01S 3/16 342/457 |
| 2005/0285784 A1 | 12/2005 | Chiang et al. | |
| 2013/0201938 A1* | 8/2013 | Seol | H04W 72/1284 370/329 |
| 2013/0301454 A1* | 11/2013 | Seol | H04B 7/043 370/252 |
| 2014/0198681 A1 | 7/2014 | Jung et al. | |
| 2014/0254515 A1* | 9/2014 | Kim | H04W 74/0833 370/329 |
| 2014/0314167 A1 | 10/2014 | Jeong et al. | |
| 2016/0119804 A1* | 4/2016 | He | H04W 24/08 370/252 |
| 2016/0157267 A1* | 6/2016 | Frenne | H04B 7/086 370/329 |
| 2016/0329631 A1* | 11/2016 | Rheinfelder | H01Q 1/246 |

* cited by examiner

【FIG. 1】
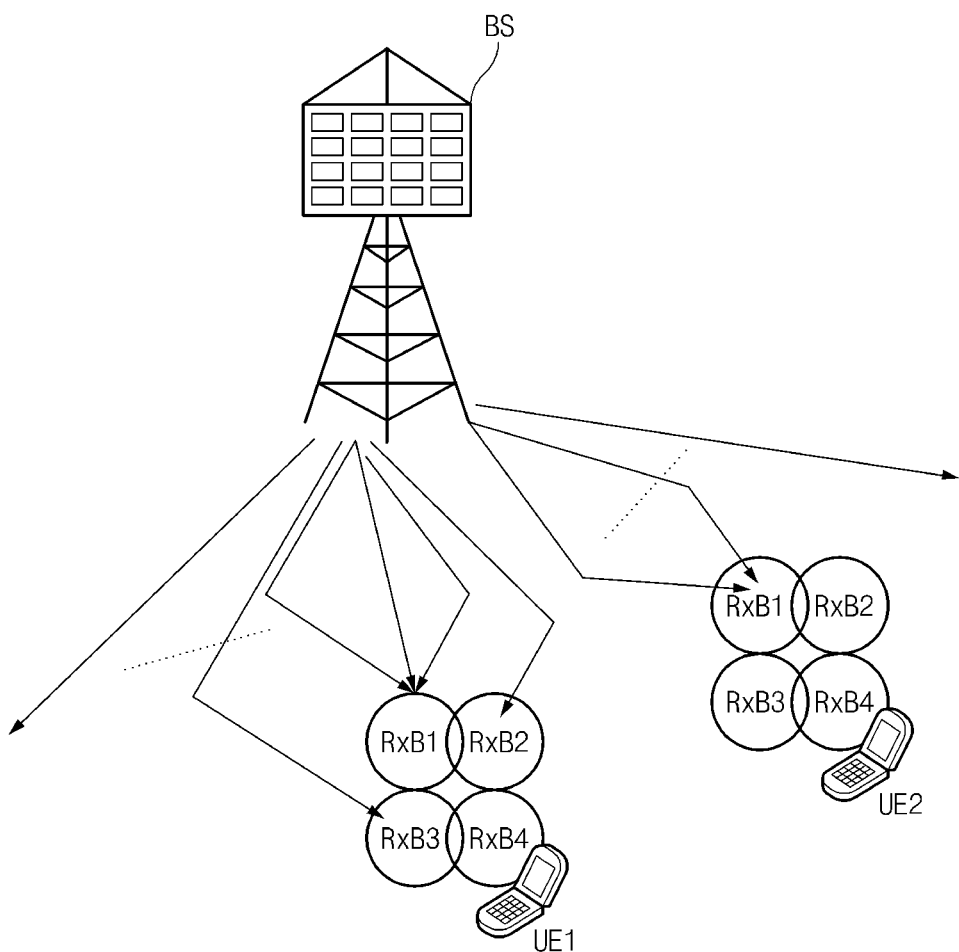

[FIG. 2]
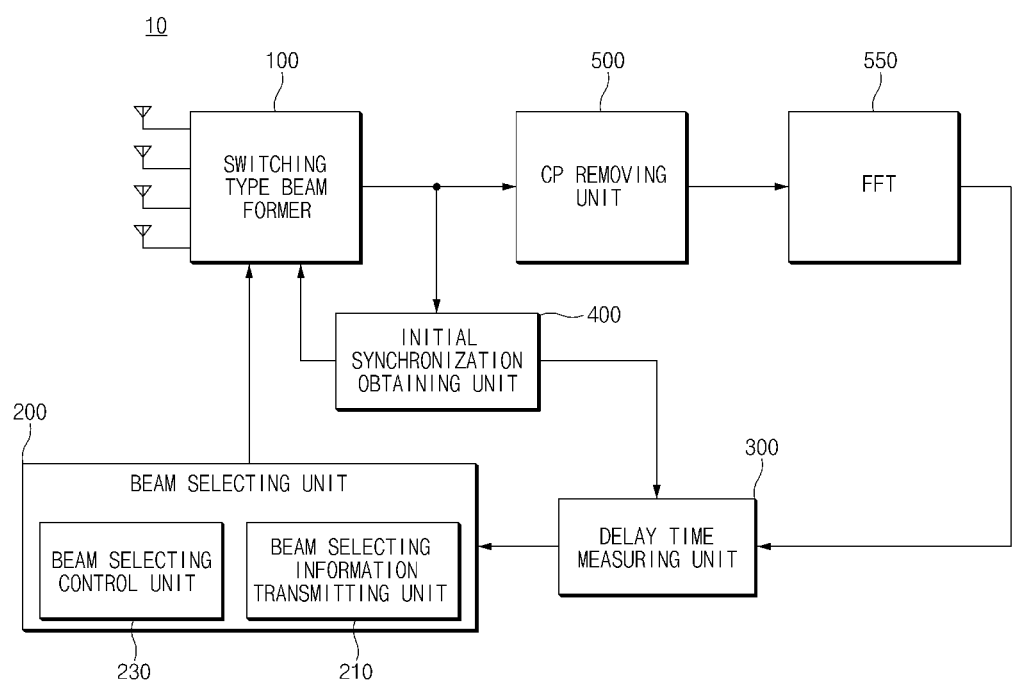

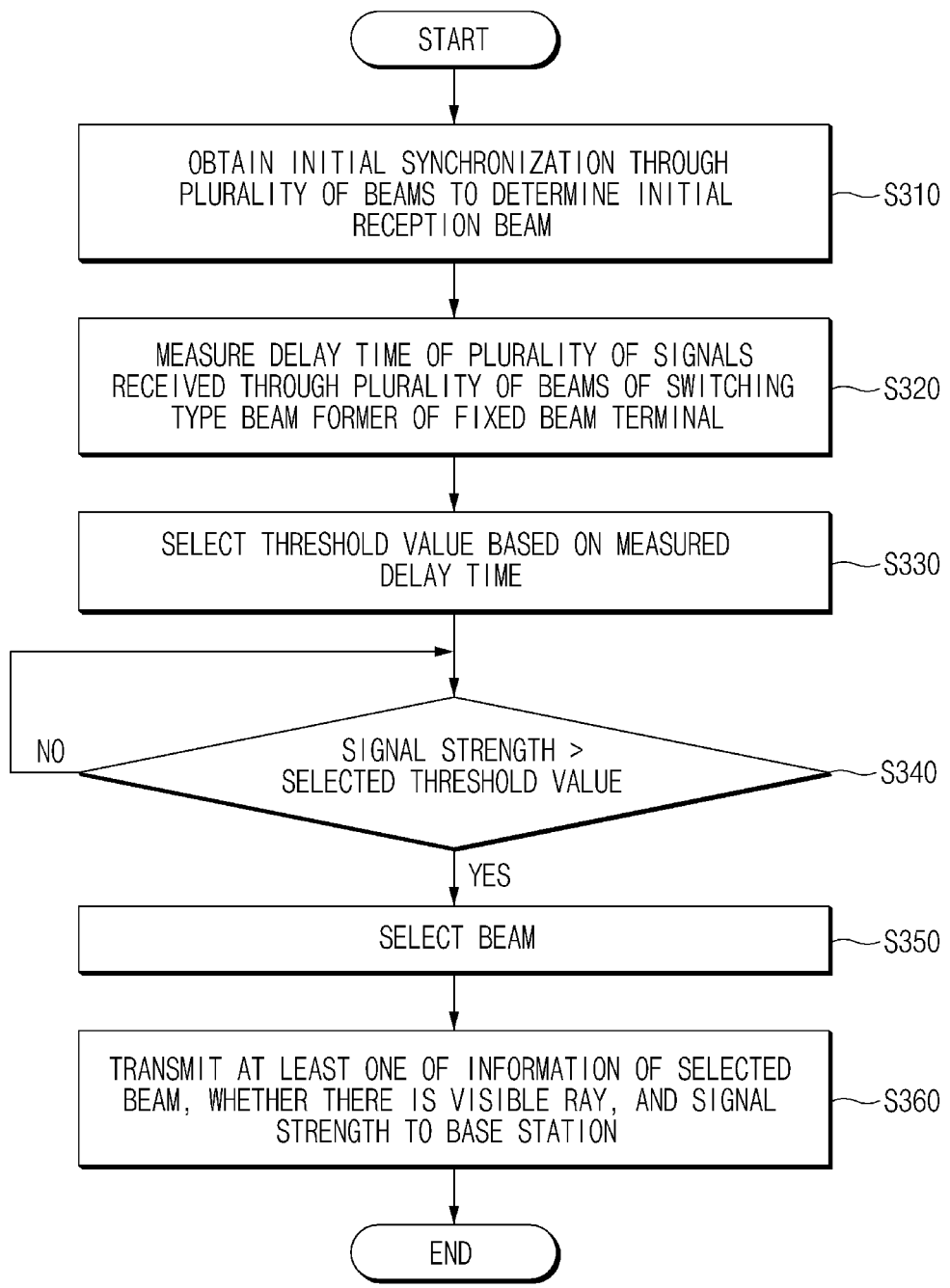

[FIG. 4]
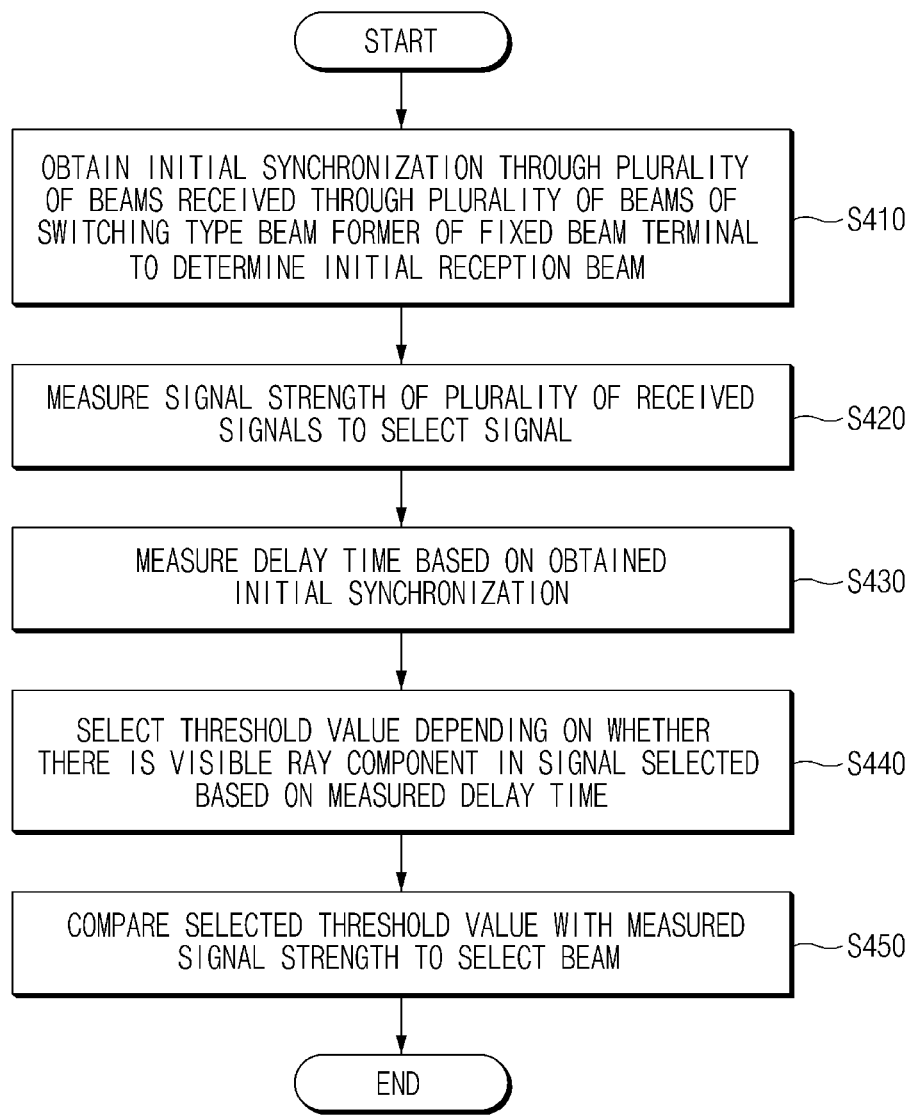

BEAM SELECTION APPARATUS AND METHOD FOR SELECTING BEAM IN A FIXED BEAM TERMINAL

CROSS-REFERENCE TO RELATED APPLICATIONS

This application claims priority to and the benefit of Korean Patent Application No. 10-2014-0194062 filed in the Korean Intellectual Property Office on Dec. 30, 2014, and Korean Patent Application No. 10-2015-0044538 filed in the Korean Intellectual Property Office on Mar. 30, 2015, the entire contents of which are incorporated herein by reference.

TECHNICAL FIELD

The present invention relates to a beam selecting apparatus and a beam selecting method, and more particularly, to an apparatus and a method for selecting a beam by different criteria depending on a strength of a received beam and presence of a line of sight (LOS) of the received beam.

BACKGROUND ART

Recently, Due to steady increase of communication traffic, research for enhancing data transfer rate in a millimeter band has being developed. However, due to a characteristic of radio wave in the millimeter band, a beam forming technology using an array antenna in which a plurality of antennas is combined is necessarily required to decrease a propagation path loss and increase a radio wave propagation distance.

Therefore, a terminal located in a cell transmitting multiple beams, performs reception beam forming by which a radio wave is concentratively received in a specific direction to obtain an optimal gain. However, due to implementation restriction of the terminal, a fixed beam forming terminal which supports specific beam forming only in one direction one time may be implemented. In this case, the terminal needs to have a beam selecting function which selects and transmits an optimal reception beam using a reference signal transmitted from a base station.

SUMMARY OF THE INVENTION

The present invention has been made in an effort to provide a beam selecting apparatus and a beam selecting method applying different threshold values depending on a strength of received beam and whether to be a line of sight (LOS) in the beams. The present invention may be applied to a terminal which selects a certain beam from a plurality of beams to form a fixed beam.

According to the beam selecting apparatus and the beam selecting method of the present invention, a beam detecting probability is increased and power loss of the terminal may be minimized by decrease unnecessary switching operations.

The present invention has been made in an effort to further provide a beam selecting apparatus and a beam selecting method which transmit information regarding a strength of a signal received in the terminal and whether to include an LOS. Such information may be utilized as a factor for determining a width of a data transmission beam to be transmitted to the terminal for a base station.

Technical objects of the present invention are not limited to the aforementioned technical objects and other technical objects which are not mentioned will be apparently appreciated by those skilled in the art from the following description.

An embodiment of the present invention provides a beam selecting apparatus of a fixed beam terminal, including a delay time measuring unit, a beam selecting unit and a switching type beam former. The delay time measuring unit measures delay times of a plurality of signals received through a plurality of beams. The beam selecting unit compares a threshold value selected based on the measured delay time and a signal strength of each of the plurality of signals to select a beam. The switching type beam former operates the plurality of beams in accordance with the selected beam.

Another embodiment of the present invention provides a beam selecting method of a fixed beam terminal. The method includes measuring delay times of a plurality of signals received through a plurality of beams of a switching type beam former of a fixed beam terminal, selecting a threshold value for every signal based on the measured delay time, comparing signal strengths of the plurality of signals with threshold values selected for the plurality of signals, and selecting a beam which receives a signal of which strength is larger than the threshold value among the plurality of signals.

Still another embodiment of the present invention provides a beam selecting method of a fixed beam terminal. The method includes obtaining initial synchronization through a plurality of beams received through a plurality of beams of a switching type beam former of a fixed beam terminal to determine an initial reception beam, measuring signal strengths of the plurality of received signals to select a signal. measuring a delay time based on the initial synchronization obtained for the selected signal, selecting a threshold value depending on whether there is an LOS component in the signal selected based on the measured delay time, and comparing the selected threshold value with the measured signal strength to select a beam.

According to the beam selecting apparatus and the beam selecting method of a fixed beam terminal according to an embodiment of the present invention, since a reception beam is selected based on a threshold value which is variously set depending on a signal strength of the received beam and whether an LOS component is present in the reception beam, a beam detecting probability may be increased. Further, a switching operation for selecting an optimal beam is minimized, thereby reducing power loss.

While the embodiments of the present invention have been described for illustrative purposes, it should be understood by those skilled in the art that various changes, modifications, substitutions, and additions may be made without departing from the spirit and scope of the present invention as defined in the appended claims.

BRIEF DESCRIPTION OF THE DRAWINGS

FIG. 1 is a view explaining communication between a fixed beam forming terminal according to an embodiment of the present invention and a base station.

FIG. 2 is a block diagram illustrating a beam selecting apparatus according to an embodiment of the present invention.

FIG. 3 is a flow chart illustrating a beam selecting method according to an embodiment of the present invention.

FIG. 4 is a flow chart illustrating a beam selecting method of a fixed beam terminal according to an embodiment of the present invention.

DETAILED DESCRIPTION

Hereinafter, some embodiments of the present invention will be described in detail with reference to the accompanying drawings. In the figures, even though the parts are illustrated in different drawings, it should be understood that like reference numerals refer to the same parts of the present invention. In describing the embodiments of the present invention, when it is determined that the detailed description of the known configuration or function related to the present invention may obscure the understanding of embodiments of the present invention, the detailed description thereof will be omitted.

In describing components of the exemplary embodiment of the present invention, terminologies such as first, second, A, B, (a), (b), and the like may be used. However, such terminologies are used only to distinguish a component from another component but nature or an order of the component is not limited by the terminologies. If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present invention.

FIG. 1 is a view illustrating communication between a fixed beam forming terminal and a base station according to an embodiment of the present invention.

Communication between a base station BS and a plurality of terminals UE1 and UE2 in a wireless communication system to which beam forming is applied will be described with reference to FIG. 1.

The base station BS transmits a synchronization channel and a reference signal in all directions.

The terminals UE1 and UE2 may include a beam selecting apparatus which receives the reference signal from the base station BS to select an optimal reception beam. The terminals UE1 and UE2 according to the embodiment of the present invention may transmit and receive a signal to/from the base station BS while switching a plurality of fixed beams.

In FIG. 1, as an example, it is illustrated that the terminals UE1 and UE2 have four fixed beams RxB1, RxB2, RxB3, and RxB4.

According to the embodiment, the first terminal UE1 receives a signal having a line of sight (LOS) component and a non-LOS component. Even though the second terminal UE2 may receive a signal having only the non-LOS component without having the LOS component depending on the position unless the signal is transmitted in a millimeter band wireless channel Because the signal is more likely to be attenuated in the millimeter band signal compared with in a normal cellular band, difference between intensities of the LOS component and the non-LOS component may become greater. Therefore, when the terminals UE1 and UE2 select a beam based on the same reference value, probability of detection and false report may be affected.

Accordingly, in the beam selecting apparatus and the beam selecting method according to the present invention, the terminals UE1 and UE2 select the beams based on different reference values depending on whether the signal received from the base station BS has an LOS component.

That is, the beam selecting apparatus provided in the terminals UE1 and UE2 selects different threshold values and compares the selected threshold values with the strength of the received signal depending on whether a signal received from the base station BS has an LOS component to select a beam. According to the above-mentioned manner is used, a switching operation to select an optimal beam may be rarely performed, thereby power consumption may be lowered.

FIG. 2 is a block diagram illustrating a beam selecting apparatus according to an embodiment of the present invention.

Referring to FIG. 2, the beam selecting apparatus 10 may be provided in a fixed beam terminal and include a delay time measuring unit 300, a beam selecting unit 200, and a switching type beam former 100.

The delay time measuring unit 300 may measure delay times of a plurality of signals which is received through a plurality of beams provided in the switching type beam former 100. For example, the delay time measuring unit 300 may calculate a channel impulse response of the received signal to measure a delay time.

In some embodiments, the beam selecting apparatus 10 according to an embodiment of the present invention may further include an initial synchronization obtaining unit 400.

The initial synchronization obtaining unit 400 obtains synchronization using timing information obtained from a beam having the largest signal intensity and determines the beam as an initial reception beam.

In some embodiments, the delay time measuring unit 300 operates a fine time synchronization block for every signal based on the obtained initial synchronization to measure a delay time for each signal. For example, the delay time measuring unit 300 operates the fine time synchronization block to trace a change of the channel and generally estimates the delay time by obtaining a channel impulse response as represented in Equation 1.

$$\hat{h}_n = \text{IFFT}\{Y(m)/X(m)\} = h_n * \delta_{n-\theta} \qquad \text{[Equation 1]}$$

Here, Y(m) and X(m) indicate frequency responses of a received signal and a reference signal transmitted from the base station BS. The channel impulse response may be obtained by performing IFFT (inverse fast Fourier transform).

The beam selecting unit 200 may select a threshold value for every signal based on the delay time measured by the delay time measuring unit 300. The beam selecting unit 200 may include a beam selecting information transmitting unit 210 and a beam selecting control unit 230.

A characteristic of the millimeter band radio wave is known that an LOS has a strong straightness and the non-LOS component extremely weakly reaches at 20 dB or less as compared with the LOS component. Therefore, it is possible to determine whether the received signal has an LOS component based on the delay time.

Specifically, when it is determined that there is almost no delay time measured by the delay time measuring unit 300, the beam selecting unit 200 may determine that the LOS component is included in the received signal. Further, when the signal is received with a delay time, the beam selecting unit 200 may determine that the signal received from the beam includes the non-LOS component.

The beam selecting unit 200 according to the embodiment of the present invention may select different threshold values depending on whether the LOS component is included in the signal, based on the delay time. As described above, different threshold values are set depending on presence of the LOS, so that an optimal reception beam is selected.

For example, the beam selecting unit 200 may compare a threshold value with the signal intensity of selected beam where the received signal having the largest signal intensity. When the signal intensity is greater than the threshold value selected for the signal, a beam from which the signal is received may be selected.

For example, the beam selecting unit 200 may measure a signal intensity based on criterion such as received signal strength indicator (RSSI) or a reference signal receive power (RSRP).

Such a method may be applied to other blocks which determine a threshold value to determine a maximum value without performing normalization as a determination standard required for an operation of the terminal.

In some embodiments, the beam selecting unit 200 may select a reception beam selectively using two threshold values depending on presence of the LOS.

However, there is no beam having a signal strength which exceeds a threshold value selected by the beam selecting unit 200. In this case, the beam selecting apparatus 10 may include a beam selecting control unit 230 to repeatedly search the reception beam again.

In some embodiments, the beam selecting control unit 230 may control the initial synchronization obtaining unit 400 and the delay time measuring unit 300 to repeatedly obtain the initial synchronization and measure a delay time as described above.

In some embodiments, even though the beam is repeatedly searched predetermined times or more, when a beam which satisfies a condition is not found, the beam selecting control unit 230 may determine that a region where the beam selecting apparatus 10 is located is a shadow area. When it is determined that the beam selecting apparatus 10 is located in a shadow area, the beam selecting control unit 230 further includes a notifying unit to notify a user that the user is located in the shadow area to provide visual and auditory alarm.

The beam selecting unit 200 may transmit beam selecting information and a strength of the selected signal through the beam selecting information transmitting unit 210 to the base station BS. The beam selecting information may include information of the received beam and whether the signal received through the beam includes an LOS.

The base station BS may utilize the information received from the terminal as a parameter which adjusts a width of the transmission beam. This is because that the base station BS transmits a reference signal for selecting the beam in all directions, but the traffic information may be transmitted through the transmission beam determined based on a quality of a uplink received signal or other states of the signal which is fedback from the terminal.

In this specification, even though it is illustrated that the beam selecting information transmitting unit 210 and the beam selecting control unit 230 are included in the beam selecting unit 200, the present invention is not limited thereto and may be implemented by various manners.

The switching type beam former 100 operates a plurality of beams in accordance with the selected beam. When the fixed beam is formed so that an optimal reception beam is changed due to movement of the terminal or change of a channel environment, the switching type beam former 100 according to the embodiment of the present invention may control the direction of the beam in accordance with the beam selecting information.

In some embodiments, the beam selecting apparatus 10 may further include a cyclic prefix (CP) removing unit 500 and an FFT 550 which process a signal received through the beam. The CP removing unit 500 removes a cyclic prefix (CP) of the received signal and the FFT 550 performs fast Fourier transform.

FIG. 3 is a flow chart illustrating a beam selecting method according to an embodiment of the present invention.

Referring to FIG. 3, a beam selecting method using a fixed beam terminal obtains initial synchronization through a plurality of beams to determine an initial reception beam in step S310.

A switching type beam former 100 of the fixed beam terminal measures delay times of signals through the plurality of beams based on the obtained initial synchronization in step S320. The delay time is measured by the delay time measuring unit 300 illustrated in FIG. 2 by operating a fine time synchronization block to trace change of the channel and the delay time is estimated by obtaining the channel impulse response.

In some embodiments, simultaneously with measuring a delay time, signal strengths of signals received through the plurality of beams may be measured.

A threshold value for selecting a reception beam is selected based on the measured delay time in step S330. Two threshold values may be determined depending on whether an LOS component is included in the received signal.

The beam selecting unit 200 compares the signal strength with the selected threshold value in step S340 and when the signal strength is larger than the threshold value (Yes in step S340), the beam selecting unit 200 selects a beam which receives the signal as a reception beam in step S350.

In some embodiments, the beam selecting unit 200 may compare a threshold value for a beam which receives a signal having the largest measured signal strength to select the reception beam or compare the signal strengths of the plurality of signals with the threshold values selected for the signals.

When the signal strength is smaller than the selected threshold value (No in step S340), the beam selecting unit 200 may repeat the process of comparing the signal strength with a threshold value selected for a signal received through another beam. When the above-described researching process is repeatedly performed, for example, the re-searching process is repeated predetermined number of times or more but there is no beam having a signal strength which exceeds the threshold value, the beam selecting unit 200 may determine that the terminal is currently located in a shadow area.

In some embodiments, when it is determined that the terminal is located in the shadow area, a visual or auditory output unit in the terminal is used to notify that the terminal is currently located in the shadow area.

In some embodiments, the information of the selected beam and the signal strength may be transmitted to the base station BS through the beam selecting information transmitting unit 210.

FIG. 4 is a flow chart illustrating a beam selecting method of a fixed beam terminal according to an embodiment of the present invention.

Referring to FIG. 4, initial synchronization is obtained through a plurality of beams received through a plurality of beams of a switching type beam former 100 of a fixed beam terminal to determine an initial reception beam in step S410. The initial synchronization obtaining unit 400 obtains synchronization using timing information obtained from a beam having the largest signal strength among a plurality of reception beams and determines the beam as an initial reception beam.

The beam selecting unit 200 measures signal strengths of the plurality of received signals to select a signal in step S420 and measures a delay time based on initial synchronization obtained for a selected signal, that is, a selected beam in step S430.

As described above, the delay time measuring unit 300 may operate to estimate a delay time using a channel impulse response.

The beam selecting unit 200 selects a threshold value depending on whether an LOS component is included in the received signal based on the measured delay time in step S440 and selects a reception beam by comparing the selected threshold value with the measured signal strength in step S450.

In some embodiment, the method may further include a step of transmitting the beam selecting information and the signal strength to the base station BS.

According to the beam selecting apparatus and the beam selecting method according to the embodiment of the present invention, signal strengths of the signals received through the plurality of beams are compared by selecting different threshold values depending on whether to receive the LOS through the corresponding beam to select the reception beam.

According to this method, a beam detecting possibility may be increased and power consumption in a terminal which selects an optimal beam to continuously operate may be minimized. Further, the beam selecting information of the terminal is transmitted to the base station, so that communication efficiency between the base station and the terminal may be improved.

It will be appreciated that various exemplary embodiments of the present invention have been described herein for purposes of illustration, and that various modifications, changes, and substitutions may be made by those skilled in the art without departing from the scope and spirit of the present invention.

Accordingly, the embodiments disclosed herein are intended to not limit but describe the technical spirit of the present invention and the scope of the technical spirit of the present invention is not restricted by the exemplary embodiments. The protection scope of the present invention should be interpreted based on the following appended claims and it should be appreciated that all technical spirits included within a range equivalent thereto are included in the protection scope of the present invention.

What is claimed is:

1. A beam selecting apparatus of a fixed beam terminal, comprising:
   an initial synchronization obtaining means configured to obtain initial synchronization through the plurality of beams to determine an initial reception beam;
   a delay time measuring means configured to measure delay times of a plurality of signals received through a plurality of beams based on the obtained initial synchronization;
   a beam selecting means configured to compare a threshold value selected based on the measured delay time and a signal strength of each of the plurality of signals to select a beam; and
   a switching type beam former configured to operate the plurality of beams in accordance with the selected beam.

2. The apparatus of claim 1, wherein the delay time measuring means operates a fine time synchronization block for each of the plurality of signals based on the obtained initial synchronization to measure the delay time.

3. The apparatus of claim 1, wherein the beam selecting means compares the measured delay time with a predetermined time to determine whether a visible ray component is included in the received signal to determine the threshold value.

4. The apparatus of claim 1, wherein when the signal strength is larger than the threshold value, the beam selecting means selects a beam which receives the signal.

5. The apparatus of claim 4, further comprising:
   a beam selecting control means configured to control to repeatedly re-search the reception beam when the plurality of signals does not have a signal whose strength is larger than the threshold value.

6. The apparatus of claim 5, wherein when the re-searching is repeated predetermined number of times or more so that no beam is selected, the beam selecting control means determines the region as a shadow area.

7. The apparatus of claim 1, further comprising:
   a beam selecting information transmitting means configured to transmit the beam selecting information and the signal strength to the base station.

8. A beam selecting method, comprising:
   obtaining initial synchronization through the plurality of beams to determine an initial reception beam;
   measuring delay times of a plurality of signals received through a plurality of beams of a switching type beam former of a fixed beam terminal based on the obtained initial synchronization;
   selecting a threshold value for every signal based on the measured delay time;
   comparing signal strengths of the plurality of signals with threshold values selected for the plurality of signals; and
   selecting a beam which receives a signal of which strength is larger than the threshold value among the plurality of signals.

9. The method of claim 8, wherein the measuring of a delay time includes measuring the delay time by operating a fine time synchronization block for every signal based on the obtained initial synchronization.

10. The method of claim 8, wherein the selecting of a beam includes repeatedly re-searching another beam when there is no signal of which strength is larger than the threshold value.

11. The method of claim 10, further comprising:
    determining a shadow area when no beam is selected even though the re-searching is repeated predetermined number of times or more.

12. The method of claim 8, further comprising:
    transmitting information of the selected beam and the signal strength to the base station.

13. A beam selecting method, comprising:
    obtaining initial synchronization through a plurality of signals received through a plurality of beams of a switching type beam former of a fixed beam terminal to determine an initial reception beam;
    measuring signal strengths of the plurality of received signals to select a signal;
    measuring a delay time based on the initial synchronization obtained for the selected signal;
    selecting a threshold value depending on whether there is a visible ray component in the signal selected based on the measured delay time; and comparing the selected threshold value with the measured signal strength to select a beam.

14. The method of claim 13, wherein the measuring of a delay time includes measuring the delay time by operating a fine time synchronization block selected signal based on the obtained initial synchronization.

15. The method of claim 13, further comprising:
repeatedly re-searching an another beam when there is no signal of which strength is larger than the threshold value.

16. The method of claim 15, further comprising:
determining a shadow area when no beam is selected even though the re-searching is repeated predetermined number of times or more.

17. The method of claim 13, further comprising:
transmitting information of the beam and the signal strength to the base station.

* * * * *